Jan. 28, 1941.  R. H. EWART  2,230,138
RUBBER ARTICLE AND METHOD OF MAKING SAME
Filed Nov. 14, 1939
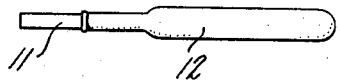
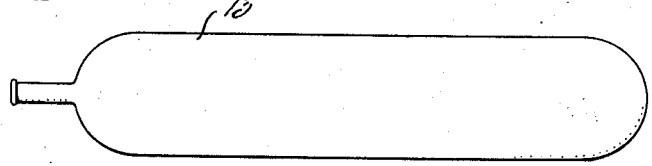
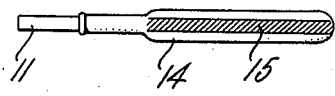
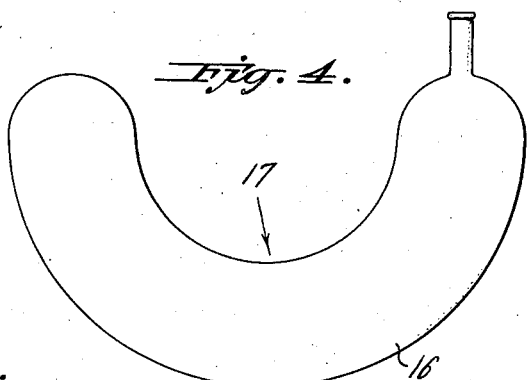
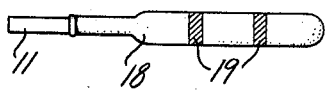
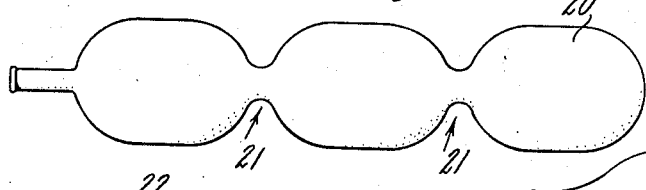
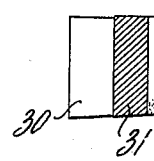
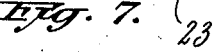
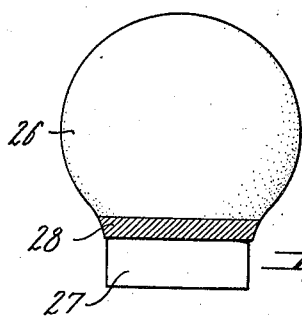
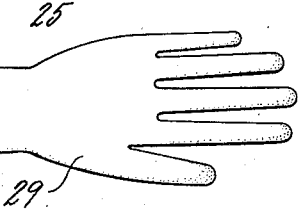
INVENTOR.
ROSWELL H. EWART
BY
ATTORNEYS Patented Jan. 28, 1941

2,230,138

UNITED STATES PATENT OFFICE 2,230,138

RUBBER ARTICLE AND METHOD OF MAKING SAME

Roswell H. Ewart, Nutley, N. J., assignor to United States Rubber Company, New York, N. Y., a corporation of New Jersey Application November 14, 1939, Serial No. 304,313

12 Claims. (Cl. 18—58)

This invention relates to the manufacture of rubber articles, and more particularly to the manufacture of stretchable and inflatable rubber articles.

The main feature of the present invention concerns the formation of stretchable and inflatable rubber articles with adjacent portions of the articles having different elastic moduli. In this manner, hollow articles, such as bathing caps and gloves, may be provided with an edge portion of the same thickness as the body portion of the article but with a higher elastic modulus, whereupon the greater contractive force of the portion of higher elastic modulus will hold the edge of the cap or glove tighter against the head or wrist of the wearer. In the case of inflatable articles, such as balloons, the difference in elastic modulus in adjacent portions of the inflatable part of the balloon will distort the shape of the balloon on inflation. Thus, balloons having many different inflated shapes can be made on the same form by varying the design and areas of the selected portions which are given a greater or smaller elastic modulus than other portions in the inflatable part of the article.

These and other features and advantages of the invention will readily appear from the detailed description and claims when considered with the drawing in which:

Figure 1 shows a balloon made on a dipping form in the conventional manner;

Figure 2 illustrates the balloon of Fig. 1 in inflated condition;

Figures 3, 5 and 7 show balloons made on the dipping form of Fig. 1 with selected portions of different elastic moduli;

Figures 4, 6 and 8 illustrate the balloons of Figs. 3, 5 and 7, respectively, in inflated condition; and Figures 9 and 10 show bathing cap and glove dipping forms with a bathing cap and glove having edge portions of higher elastic modulus than the body portions of the articles.

In carrying out the present invention the stretchable or inflatable rubber article, or part of such article, which is to have portions of different elastic moduli, is first made in a conventional manner in an unvulcanized or partially vulcanized condition. This may be accomplished by molding masticated rubber in molds of the desired shape, or by building up the article by cementing or cut-seaming the parts of the article cut from calendered sheeting, or the article may be deposited directly as a unit from rubber cement or from an aqueous dispersion of rubber in various known ways, the specific method of making the article per se forming no part of the present invention. In usual rubber practice, after forming the rubber article by any of the above methods, the article is vulcanized either by heating in air, steam or water, if the stock contains vulcanizing ingredients which will cause vulcanization under such heating conditions, or by permitting the article to stand until vulcanization has taken place if the stock contains among other vulcanizing ingredients an ultra rapid accelerator capable of causing vulcanization at room temperatures. When the stock does not contain sulphur, it may be vulcanized by treating with sulphur chloride, or sulphur chloride in solution, as is well known. According to the present invention, before such a conventional vulcanizing operation is permitted to take place, the vulcanization characteristics of predetermined areas of the article are changed so that the conventional vulcanization step will cause the thus treated portions of the article to be vulcanized to a degree different from that of the adjacent or remaining portions of the article and hence cause these selected portions to have a different elastic modulus from the remaining portions of the article. The selected portions of the article may be so treated that in the finished article, they will be vulcanized to either a higher or lower state of vulcanization than the remaining portions of the article, as desired, and hence may have a greater or smaller elastic modulus than the adjacent portions of the article.

Where it is desired to increase the elastic modulus of the selected portions on vulcanization of the article, various methods of accomplishing this result may be used. For example, a sulphur paste may be applied to the surface of selected portions of an article which contains the proper vulcanizing combination to give the desired degree of vulcanization in the remaining portions of the article, whereupon on vulcanization, as by heating, the sulphur will migrate into the selected portions and produce a higher elastic modulus in these predetermined areas than in the remaining portions of the article. The sulphur content of the selected portions may be increased by applying a solvent solution of sulphur, or a solution of a polysulphide, to the selected portions of the surface instead of the sulphur paste, as described above. It is also possible to produce an increase in the elastic medulus of selected areas by other methods than migration of sulphur into these areas. For example, additional accelerator may be applied in the form of paste or solution to the selected areas so that under the vulcanizing conditions, a larger amount of sulphur will be combined with the rubber in these areas, although the total sulphur content of the rubber stock will not vary in the different portions of the article. Similarly, an activator for the accelerator in the rubber stock may be applied to the selected areas where a higher elastic modulus is desired. Again, an increase in the elastic modulus of the selected portions may be produced by the application of a rubber-soluble zinc salt, such as zinc stearate or zinc laurate, to the selected areas prior to vulcanization of the article by heating. Where the rubber stock does not contain sulphur, as where the vulcanization of the article is to be accomplished by treatment with sulphur chloride, the selected portions of the article wherein a higher elastic modulus is desired, may be preliminarily treated with a solution of the desired strength of sulphur chloride before curing of the article as a whole, whereupon the preliminary treatment will produce in these selected areas an increased elastic modulus over the remaining portions. Where it is desired to decrease rather than increase the elastic modulus of selected portions of the rubber article in order to provide a greater distention rather than contraction of the predetermined areas in the finished article, this may be accomplished in various ways. Where rubber stocks containing vulcanizing ingredients are to be vulcanized by heating or, in the case of ultra rapid accelerator, on standing, the elastic modulus of selected areas of the finished article may be made smaller than the elastic modulus of the remaining portions of the article by treatment of these predetermined areas with a material which will reduce the rate of vulcanization, as for example by treating with acid where the accelerator is partially or wholly inactivated by acid, as in the case of the dithiocarbamate accelerators, or by the treatment with ammonia or fixed alkali where these materials will retard or inactivate the accelerator, as for example, in the case of xanthates and benzothiazyl sulphides. In the case of treatment of rubber stock where the rubber stock is to be vulcanized by means of sulphur chloride, the areas where the lesser elastic modulus is desired may be treated with paraffin or other material which will retard, or if desired completely prevent, the action of the sulphur chloride on these predetermined portions. Various methods of providing areas of greater or smaller elastic modulus than adjacent areas may likewise be utilized in the case of synthetic rubber-like materials, which materials are intended to be included in the term "rubber" as used in the description and claims of this specification even though vulcanization, as in the case of neoprene, which is polymerized chloro-2-butadiene 1, 3, may be made to take place on heating in the absence of sulphur, if desired. The expression "vulcanization" as used herein with reference to the various synthetic rubber-like materials refers to the transformation of the product from a more plastic state resembling unvulcanized rubber into the more elastic state resembling vulcanized rubber, whether such change is accomplished by heating in the presence or absence of sulphur. The elastic modulus of selected portions of neoprene articles, for example, may be increased by treating the surface of the predetermined areas with zinc dibutyl dithiocarbamate paste, or with a solution of sodium dibutyl dithiocarbamate if the neoprene stock itself contains zinc oxide, lithopone and sulphur. The elastic modulus of selected portions of neoprene stock may be reduced on vulcanization by the treatment of such portions before heating to vulcanize with sodium silicate or a plasticizer such as pine oil or tricresyl phosphate. Buna N rubber stocks may be treated in the same manner as natural rubber stocks for varying the elastic modulus of selected portions of the finished article. "Buna N" is the trade name for a copolymer of butadiene and acrylic nitrile. The elastic modulus of selected portions of Thiokol stocks may be reduced by treatment with an amine such as triethanol amine or aniline. "Thiokol" is the trade name for olefin polysulphide plastics.

In order to illustrate the invention, various articles deposited directly from an aqueous dispersion of rubber are shown in the drawing with selected portions of different elastic modulus from adjacent or remaining portions, such changes in elastic modulus in adjacent portions being produced according to the present invention. It is understood, of course, that the formation of the articles by a deposition process is merely illustrative and that the articles may be produced by other known methods of forming rubber articles per se, as by conventional molding of the article as a unit, or molding parts of it and cementing the parts together to make a whole, or by assembling parts of the article from sheet stock and cementing or cut-seaming the parts.

As a specific illustration of the formation of rubber articles by deposition directly from an aqueous dispersion of rubber, forms of the desired shape, a conventional balloon form as in Figs. 1, 3, 5 and 7, and conventional bathing cap and glove forms in Figs. 9 and 10 respectively, were first dipped in a latex compound of the following formula:

| | Parts by weight |
|---|---|
| Rubber (as 60% concentration creamed latex) | 100 |
| Potassium hydroxide | .3 |
| Zinc oxide | .75 |
| Sulphur | .30 |
| Zinc benzthiazyl sulphide | .4 |
| Piperidonium pentamethylene dithio carbamate | .4 |

The compounding ingredients were added to the latex in the form of aqueous pastes or solutions and the final compound made up to 58% solids. This dip was an in-and-out dip followed by an in-and-out dip into a coagulant comprising 9 parts alcohol and 1 part of 80% acetic acid. The forms with the coagulant adhering to the first latex coat were again dipped into the latex compound and allowed to remain until the desired thickness of articles had been built up, after which they were removed from the latex and placed in an oven at 212° F. for a few minutes until the coagulum on the forms had partially dried, after which the forms were removed and, in the case of the balloons, a ring roll made on the articles. This is a convenient time for application of the material to change the vulcanization characteristics of the selected portions of the article where a ring rolling operation is to be performed on a dipped article, but such treatment may be made to take place at any convenient time before completion of the vulcanization of the article. This same process may be used where the form is first dipped in a coagulant such as magnesium acetate or calcium nitrate and then in the latex compound. In the examples of Figs. 3 to 6, 9 and 10, the selected portions of the articles were painted with an aqueous paste containing 20% sulphur and 30% of colloidal clay to produce areas of greater elastic modulus than the remaining portions of the articles. In the example of Figs. 7 and 8, the selected portion was painted with a mixture containing 1 part alcohol and 1 part 80% acetic acid to reduce the vulcanizing effect of the accelerator combination in the selected area and to product therein in the final product a smaller elastic modulus than the remaining portions. It should be noted here that the extent to which dithiocarbamates are deactivated by acid depends on the final acidity of the stock. Thus it is possible to acid coagulate with dilute acid without much loss in activity and later by the use of stronger acid to further reduce the activity of the accelerator in certain areas. After painting with the sulphur paste or with the acetic acid, the forms were put back in the oven until completion of the vulcanization. Because of the very active accelerator combination used in the latex compound, it was not necessary to increase the temperature to above the drying temperature of 212° F. for vulcanization, but with other vulcanizing combinations it may be desirable, or necessary, to vulcanize at higher temperatures.

The effect of the above described treatment as applied to various portions of inflatable articles, and as applied to edge portions of hollow articles such as bathing caps and gloves, is illustrated in the drawing. Fig. 1 shows a conventional balloon dipping form 11 on which has been deposited a rubber balloon 12, and in this case no sulphur paste was applied to the surface of the balloon before vulcanization, so that this represents conventional balloon practice, and is included herein to better illustrate the effect in change of the elastic modulus of various portions of the same balloon, as is shown in Figs. 3 to 8. The balloon of Fig. 1 in its inflated condition is illustrated as the conventional inflated balloon 13 of Fig. 2. In the case of the balloon 14 deposited on the form 11 in Fig. 3, the sulphur paste, as above described, was applied in a narrow strip lengthwise of the balloon, as shown at 15. The balloon 14 in its inflated shape is shown in Fig. 4 as the inflated article 16, the increase of the elastic modulus in the area 15 producing the inwardly curved or sausage effect, as at 17. In the balloon 18 deposited on the form 11 in Fig. 5, the sulphur paste was applied in two annular rings 19 and, as shown in its inflated condition as in the inflated balloon 20 in Fig. 6, the increase in elastic modulus of these areas produced constricted portions 21 in the finished article. Figs. 7 and 8 illustrate a balloon where the elastic modulus of a selected portion of the finished article is less than the remaining portion in the inflated part of the article. This was accomplished as illustrated in Fig. 7 by treating a selected annular portion 23 of the balloon 22 on the form 11 with acetic acid before vulcanizing, as described above. The balloon of Fig. 7 in inflated condition is shown as the inflated balloon 24 in Fig. 8 with the treated annular portion 25 as distended a greater extent than the remaining portions of the inflated part of the article because of its smaller elastic modulus. Fig. 9 illustrates a bathing cap 26 on the form 27 with the edge portion 28 of a higher elastic modulus than the head portion of the bathing cap produced by applying the sulphur paste to the edge portion prior to vulcanization. This higher elastic modulus of the rubber at the edge of the cap aids in keeping the cap snugly on the head but the top of the cap may be easily stretched so as to conform to the head-shape of the wearer. Similarly, Fig. 10 shows a glove 29 on form 30 with the edge portion 31 of a higher elastic modulus produced by treatment with sulphur paste prior to the final vulcanization step. This increased elastic modulus of the edge portion of the glove permits the glove to be held tightly around the wrist of the wearer.

It is understood that the invention is not limited to the specific embodiments shown in the examples and drawing as will be evident to those skilled in the art, and that the invention permits of various modifications without departing from the spirit thereof. With the above detailed disclosure of the invention, it is evident that numerous modifications will suggest themselves to those skilled in the art and it is not desired to limit the invention otherwise than as set forth in the appended claims.

Having thus described my invention, what I claim and desire to protect by Letters Patent is:

1. The method which comprises forming a stretchable article of a vulcanizable rubber composition, changing the vulcanization characteristics of selected portions of said article, and submitting said article to vulcanizing conditions, whereby said selected portions will have a different elastic modulus from adjacent portions of said article.

2. The method which comprises forming a stretchable article of a rubber composition capable of vulcanizing on heating, changing the vulcanization characteristics of selected portions of said article, and uniformly heating the article to vulcanize the same, whereby said selected portions will have a different elastic modulus from adjacent portions of said article.

3. The method which comprises forming an inflatable article of a vulcanizable rubber composition, changing the vulcanization characteristics of selected portions of said article, and submitting said article to vulcanizing conditions, whereby said selected portions will have a different elastic modulus from adjacent portions of said article and cause deformation of the shape of the article on inflation thereof.

4. The method which comprises forming an inflatable article of a rubber composition capable of vulcanizing on heating, changing the vulcanization characteristics of selected portions of said article, and uniformly heating the article to vulcanize the same, whereby said selected portions will have a different elastic modulus from adjacent portions of said article and cause deformation of the shape of the article on inflation thereof.

5. The method which comprises forming a stretchable article of a vulcanizable rubber composition, treating selected portions of said article so that on vulcanization of the article said selected portions will have a different elastic modulus from adjacent portions of said article, and submitting said article to vulcanizing conditions.

6. The method which comprises forming an inflatable article of a vulcanizable rubber composition, treating selected portions of said article so that on vulcanization of the article said selected portions will have a different elastic modulus from adjacent portions of said article, and submitting said article to vulcanizing conditions whereby the shape of the article will be deformed on inflation thereof.

7. An inflatable rubber article having selected portions of different elastic modulus from adjacent portions in the inflatable part of the article, whereby the shape of the article will be deformed on inflation thereof.

8. An inflatable rubber article having selected portions of different elastic modulus from, but of the same thickness as, adjacent portions in the inflatable part of the article, whereby the shape of the article will be deformed on inflation thereof.

9. A stretchable hollow rubber article having edge portions of different elastic modulus from, but of the same thickness as, body portions of said article.

10. An inflatable rubber article deposited as a unit directly from an aqueous dispersion of rubber having selected portions of different elastic modulus from adjacent portions in the inflatable part of the article, whereby the shape of the article will be deformed on inflation thereof.

11. An inflatable rubber article deposited as a unit directly from an aqueous dispersion of rubber having selected portions of different elastic modulus from, but of the same thickness as, adjacent portions in the inflatable part of the article, whereby the shape of the article will be deformed on inflation thereof.

12. A stretchable hollow article deposited as a unit directly from an aqueous dispersion of rubber having edge portions of different elastic modulus from, but of the same thickness as, body portions of said article.

ROSWELL H. EWART.